July 28, 1931. C. F. OGREN 1,816,740
FLEXIBLE ARMORED HOSE
Filed Oct. 29, 1929

Inventor:
Carl F. Ogren
by his Attorneys
Howson & Howson

Patented July 28, 1931

1,816,740

UNITED STATES PATENT OFFICE

CARL F. OGREN, OF TRENTON, NEW JERSEY, ASSIGNOR TO THERMOID RUBBER COMPANY, OF TRENTON, NEW JERSEY, A CORPORATION OF NEW JERSEY

FLEXIBLE ARMORED HOSE

Application filed October 29, 1929. Serial No. 403,234.

This invention relates to improvements in armored hose, and one object of the invention is to provide hose of this type, in which provision is made for preventing abrasion of the outer surface of the tube which constitutes the hose proper by the metallic or other armor.

Another object of the invention is to provide hose of the stated type having a superior flexibility.

Figure 1:
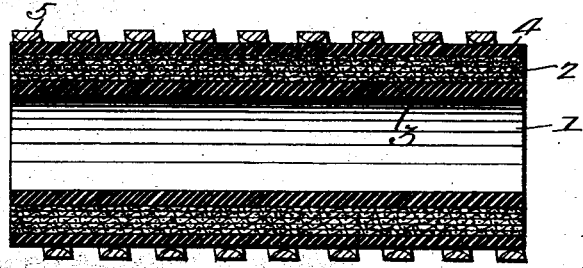
Figure 2:
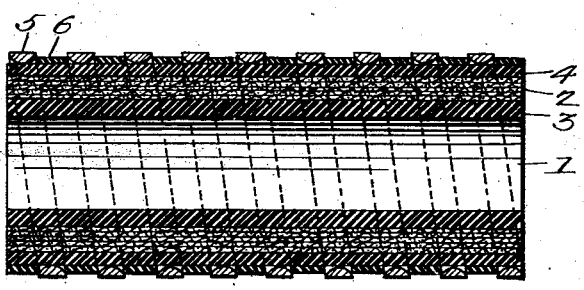
Figure 3:
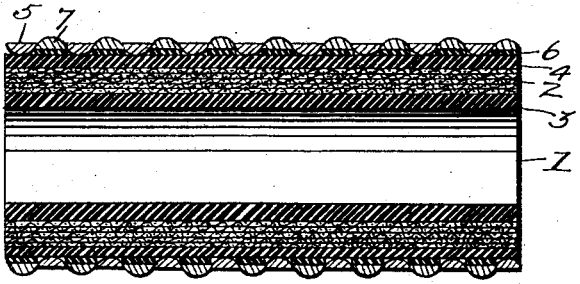
Figure 4:
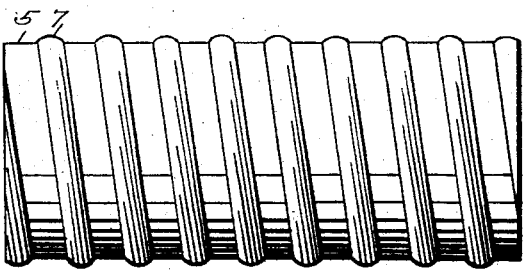

In the attached drawings:

Figures 1, 2, and 3 are sectional views of fragments of hose, illustrating successive steps in the process of manufacture; and Fig. 4 is a side view illustrating the finished article.

With reference to the drawings:

1 is a section of a known type of rubber hose, this hose being made up of a plurality of layers of rubberized fabric 2, and inner and outer sheaths or facings, 3 and 4, of vulcanized rubber.

It is customary in armoring hose of this type to form the armor by means of metallic wires 5 wound spirally upon the outer sheath 4. These wires in a desirable form are half-round in cross-section, as illustrated, and in one type of sheathing two of such wires are used, one being applied in an open helix with the rounded surface contacting with the outer sheath 4, as shown in Fig. 1, and the other being wound helically in the spaces between the convolutions of the first wire but being reversed so that the flat side lies against the rubber sheat. This arrangement of wires affords a continuous metallic armor surrounding the hose, and also affords a desirable flexibility.

One disadvantage of the aforedescribed construction resides in the fact that the sharp corners of that one of the wires which is laid flat against the sheath has a tendency to abrade and gradually destroy the latter, particularly where the hose is subjected to considerable or continuous flexing. I have discovered means whereby this abrading action may be entirely eliminated, said means also increasing the flexibility of the armored hose.

In forming a hose in accordance with my invention, I may apply one of the armor wires 5 in an open helix as shown in Fig. 1, with the rounded side of the wire in contact with the sheath 4. Thereafter, and as shown in Fig. 2, I lay in the space between the convolutions, a strip of uncured rubber 6, this strip being of a width substantially filling the space between the convolutions and preferably being in thickness about one-half of the thickness of the said wire.

Following insertion of the rubber strip 6, the hose is subjected to a vulcanizing operation which thoroughly incorporates the rubber strip 6 with the sheath 4 and makes them in effect an integral body. This vulcanizing operation also cures the rubber strip 6 and gives it the desired flexibility and strength.

Thereafter as shown in Fig. 3, I apply a second wire 7 within the space between the wires 5, and directly upon the inserted rubber 6. This gives a construction substantially as shown in Fig. 3.

It will now be apparent that the flat or inner side of the wire 7 is elevated from the normal outer surface of the sheath 4 by the inserted rubber strip 6 and that the sharp edges thereof are accordingly prevented, regardless of the degree of flexure of the hose, within reasonable limits, from coming into abrading contact with any part of the outer rubber surface. At the same time, by reason of the reduced area of contact between the adjacent wires 5 and 7, the flexibility of the hose is materially increased. A hose constructed in accordance with the aforedescribed procedure has been found to possess a relatively high durability.

It is to be noted that the invention is not limited to the exact process of manufacture described above. The helical strip 6 of rubber may, for example, be laid prior to the winding of the wire 5, or in fact may be formed as an integral part of the sheath 4.

I claim:

1. A conduit of relatively soft abradable material, having a surface projection in the form of an open helix and means for shielding the outer surface of said conduit, comprising helical metallic wires wound respectively upon and between successive convolutions of said projection.

2. A flexible rubber hose having on its outer surface a projection in the form of an open helix extending completely around the hose in successive convolutions, a half-round wire wound upon the hose intermediate the convolutions of said helical projection, the curved surface of said half-round wire normally lying in contact with the surface of the hose, and a second half-round wire wound between the convolutions of the first-named wire and with its flat side seated upon the said helical projection, said wires together forming a substantially continuous armor for the hose.

3. A conduit of relatively soft abradable material having a superficial armor consisting of helical convolutions of a pair of metallic strands of approximately half round section, the convolutions of one strand lying contiguous to the convolutions of the other, and said strands being in relatively inverted positions whereby the rounded surfaces face in opposite directions, and a helically formed surface projection on the conduit constituting a seat for the flat side of one of said strands and effecting a relative radial displacement of the strands.

4. A conduit of relatively soft abradable material having a superficial armor consisting of helical convolutions of a pair of metallic strands of approximately half round section, the convolutions of one strand lying contiguous to the other, and the strands being in relatively inverted positions whereby the rounded surface of one of said strands and the flat surface of the other engage the outer surface of the conduit, and said strands being radially offset with respect to each other.

CARL F. OGREN.